United States Patent
Chae et al.

(10) Patent No.: US 6,795,142 B2
(45) Date of Patent: Sep. 21, 2004

(54) LIQUID CRYSTAL DISPLAY DEVICE HAVING FIRST COLOR PIXEL WITH DIFFERENT CHANNEL WIDTH/LENGTH RATIO THAN SECOND COLOR PIXEL

(75) Inventors: Gee-Sung Chae, Inchon (KR); Ik-Soo Kim, Kyungki-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 10 days.

(21) Appl. No.: 10/281,137

(22) Filed: Oct. 28, 2002

(65) Prior Publication Data

US 2003/0090603 A1 May 15, 2003

(30) Foreign Application Priority Data

Oct. 29, 2001 (KR) .................. 10-2001-0066819

(51) Int. Cl.[7] ...................... G02F 1/1335; G02F 1/1343
(52) U.S. Cl. ........................ 349/106; 349/143
(58) Field of Search ................. 349/106–109, 349/143, 144

(56) References Cited

U.S. PATENT DOCUMENTS

| | | | | | |
|---|---|---|---|---|---|
| 5,235,448 | A | * | 8/1993 | Suzuki et al. | 349/43 |
| 6,466,285 | B1 | * | 10/2002 | Ichikawa | 349/95 |
| 6,707,067 | B2 | * | 3/2004 | Zhong et al. | 257/59 |
| 2003/0011729 | A1 | * | 1/2003 | Song et al. | 349/107 |

* cited by examiner

Primary Examiner—Tarifur R. Chowdhury
(74) Attorney, Agent, or Firm—Morgan, Lewis & Bockius LLP

(57) ABSTRACT

A liquid crystal display includes a color filter substrate having a red, green and blue color filters formed thereon as a matrix, a thin film transistor array substrate having liquid crystal cells of red, green and blue pixels corresponding to the red, green and blue color filters, wherein each liquid crystal cell has a thin film transistor and a liquid crystal layer between the color filter substrate and the thin film transistor array substrate, wherein a first channel width/length ratio is provided for a thin film transistor in the liquid crystal cell of a first color pixel that is different from a second channel width/length ratio provided for a thin film transistor in the liquid crystal cell of a second color pixel.

18 Claims, 7 Drawing Sheets

LIQUID CRYSTAL DISPLAY DEVICE HAVING FIRST COLOR PIXEL WITH DIFFERENT CHANNEL WIDTH/LENGTH RATIO THAN SECOND COLOR PIXEL

This application claims the benefit of the Korean Application No. 66819/2001 filed on Oct. 29, 2001, which is hereby incorporated by reference in its entirety.

BACKGROUND OF THE INVENTION

1. Field of the Invention

The present invention relates to a structure of a thin film transistor array of a color liquid crystal display, and more particularly, to a substrate structure of a liquid crystal display device suitable for preventing a flicker phenomenon from occurring in a liquid crystal cell of a specific pixel due difference in photo leakage current among liquid crystal cells of red, green and blue pixels.

2. Description of the Background Art

In general, a liquid crystal display device displays a desired picture by supplying data signals with picture information to liquid crystal cells arranged in a matrix such that light transmittance of the liquid crystal cells is controlled. The liquid crystal display device includes a liquid crystal display panel in which liquid crystal cells are arranged in a matrix and driver integrated circuits for driving the liquid crystal cells. The liquid crystal display panel includes a color filter substrate and a thin film transistor array substrate that face each other with liquid crystal filled in between the color filter substrate and the thin film transistor array substrate.

A plurality of data lines are on the thin film transistor array substrate for transmitting data signals from a data driver integrated circuit to the liquid crystal cells. A plurality of gate lines are on the thin film transistor array substrate for transmitting scan signals from a gate driver integrated circuit to the liquid crystal cells. The liquid crystal cells are defined at each intersection of a data line and a gate line. A gate driver integrated circuit sequentially supplies a scan signal to the plurality of gate lines such that the liquid crystal cells, which are in a matrix, are sequentially selected line by line. Data signals are supplied from the data driver integrated circuit to the liquid crystal cells in a selected line of liquid crystal cells.

A common electrode is formed on the color filter substrate and a pixel electrode is formed on the thin film transistor array substrate such that the common electrode and pixel electrode face each other for applying an electric field across the liquid crystal layer. A pixel electrode is formed in each liquid crystal cell and connected to a thin film transistor on the thin film transistor array substrate. A common electrode is integrally formed on the entire surface of the color filter substrate. By controlling a voltage applied to the pixel electrode in each liquid crystal cell while applying a voltage to the common electrode, the light transmittance of the liquid crystal cells can be individually controlled.

In order to control the voltage applied to the pixel electrode in each liquid crystal cell, the thin film transistor is used as a switching device in each liquid crystal cell. A scan signal supplied to the gate electrode of the thin film transistor through a gate line results in a conductive channel being formed between the source electrode and drain electrode of the thin film transistor. Thus, a data signal supplied to the source electrode of the thin film transistor through a data line is applied to the pixel electrode by way of the drain electrode of the thin film transistor.

Elements of a liquid crystal display device will now be described in detail with reference to FIG. 1A, which is a plan view of an exemplary liquid crystal cell in a liquid crystal display device. The liquid crystal cell, as shown in FIG. 1A, is formed at the intersection of a data line 2 and a gate line 4. The liquid crystal cell includes a thin film transistor TFT and a pixel electrode 14 connected to a drain electrode 12 of the thin film transistor TFT. A source electrode 8 of the thin film transistor TFT is connected to the data line 2. A gate electrode 10 of the thin film transistor TFT is connected to the gate line 4. The drain electrode 12 of the thin film transistor TFT is connected to the pixel electrode 14 through a drain contact hole 16. The thin film transistor TFT includes an active layer (not shown) which forms a conductive channel between the source electrode 8 and the drain electrode 12 when a scan signal is supplied to the gate electrode 10 through the gate line 4.

When the conductive channel is formed between the source electrode 8 and the drain electrode 12 in the active layer by the scan signal supplied from the gate line 4, the data signal supplied to the source electrode 8 through the data line 2 is transmitted to the drain electrode 12. The pixel electrode 14 is formed in the liquid crystal cell at a region where the liquid crystal cell is positioned. A material, such as indium tin oxide (ITO), with a high light transmittance is used as the pixel electrode 14. Together with the common electrode (not shown), the pixel electrode 14 applies an electric field to the liquid crystal layer using the data signal supplied through the thin film transistor TFT and via the drain electrode 12.

The liquid crystal is rotated by a dielectric anisotropy when the electric field is applied across the liquid crystal layer. The rotated liquid crystal allows light emitted from a back light (not shown) through the pixel electrode 14 to be transmitted toward the color filter substrate. The amount of transmitted light is controlled by the voltage value of the data signal.

A storage electrode 20 connected to the pixel electrode 14 through the storage contact hole 22 is deposited on the gate line 4 to form a capacitor 18. A gate insulation film (not shown), which is deposited during the formation of the thin film transistor TFT, is between the storage electrode 20 and the gate line 4 to isolate the storage electrode 20 from the gate line 4. The storage capacitor 18 charges to a voltage value of the scan signal during a turn-on period of the thin film transistor when a scan signal is applied to the front stage gate line 4, and supplies a voltage charge to the pixel electrode 14 during a turn-off period of the thin film transistor to thereby maintain a drive voltage for the liquid crystal cell.

FIG. 1B is a sectional view of an exemplary thin film transistor TFT taken along line I–I' of FIG. 1A. As shown in FIG. 1B, the liquid crystal display device includes a thin film transistor array substrate 50, a color filter substrate 70 and a liquid crystal layer 80. The color filter substrate 70 is adhered to the thin film transistor array substrate 50 using a sealing material 60. The liquid crystal layer 80 is positioned between the thin film transistor array substrate 50 and the color filter substrate 70.

A process for fabricating the thin film transistor of a liquid crystal display device will now be described in detail with reference to FIG. 1B. First, a metal material, such as Mo, Al or Cr, is deposited on a glass substrate 1 of the thin film transistor array substrate 50 by a sputtering method and patterned through a first mask to form the gate electrode 10. An insulation material such as SiNx is deposited on the glass substrate 1 and on the gate electrode 10 to form a gate insulation film 30. A semiconductor layer 32 made of amorphous silicon and an ohmic contact layer 34 made of n+ amorphous silicon with high density phosphor doped therein are successively deposited on the gate insulation film 30. The semiconductor layer 32 and the ohmic contact layer 34 are then patterned through a second mask to form an active layer 36 of the thin film transistor TFT. A metal material is deposited on the gate insulation film 30 and the ohmic contact layer 34, and then patterned through a third mask to form a source electrode 8 and a drain electrode 12 of the thin film transistor TFT. The source electrode 8 and the drain electrode 12 are then patterned such that they are isolated and face each other on the upper surface of the active layer 36. Thus, the ohmic contact layer 34 is exposed on the upper surface of the active layer 36.

In order to remove the exposed ohmic contact layer 34 between the source electrode 8 and the drain electrode 12 so as to expose the lower semiconductor layer 32, the ohmic contact layer 34 is patterned. The exposed semiconductor layer 32 between the source electrode 8 and the drain electrode 12 is defined as a channel region of the thin film transistor TFT. A passivation film 38 made of SiNx is deposited on the gate insulation film 30, the source electrode 8 and the drain electrode 12, as well as, on the exposed semiconductor layer 32 by a chemical vapor deposition (CVD) method.

As discussed above, an inorganic substance, such as SiNx, can be the material used as the passivation film 38. To improve an aperture ratio of a liquid crystal cell, organic substances with a low dielectric constant such as benzocyclobutene (BCB), spin on glass (SOG) or Acrylic, can be used. After the passivation film 38 is deposited, a portion of the passivation film 38 on the drain electrode 12 is selectively etched using a fourth mask to form a drain contact hole 16 to expose a portion of the drain electrode 12. A transparent electrode material is then deposited on the passivation film 38 by sputtering and patterned using a fifth mask to form the pixel electrode 14 such that the pixel electrode 14 is connected to the drain electrode 12 through the drain contact hole 16. Subsequently, an orientation film 51 is formed on an upper portion of the resulting structure of the thin film transistor TFT, which is subjected to rubbing to thereby complete fabrication of a thin film transistor array substrate 50.

FIG. 1C is a sectional view of the storage capacitor 18 region taken along line II–II' of FIG. 1A. The fabrication process of the storage capacitor 18 of a liquid crystal display device will now be described in detail with reference to FIG. 1C. First, a gate line 4 is patterned on a glass substrate 1 of a thin film transistor array substrate 50. Then, a gate insulation film 30 is formed on the gate line 4 and on the glass substrate 1. The gate line 4 can be patterned when the gate electrode 10 of the thin film transistor TFT is patterned. A portion of the gate line 4 overlaps the storage electrode 20, which makes a lower electrode of the storage capacitor 18. The storage electrode 20 is patterned on the upper surface of the gate insulation film 30. The storage electrode 20 can be patterned when the source and drain electrodes 8 and 12 of the thin film transistor TFT are patterned. The storage electrode 20 overlaps a portion of the gate line 4 with the gate insulation film 30 therebetween and makes an upper electrode of the storage capacitor 18.

Subsequently, the passivation film 38 is formed on an upper surface of the gate insulation film 30 on which the storage electrode 20 is formed. A portion of the passivation film 38 formed on the upper surface of the storage electrode 20 is etched to form a storage contact hole 22, so that the portion of the storage electrode 20 is exposed through the storage contact hole 22. The passivation film 38 for the storage electrode 20 can be formed simultaneously with the passivation film 38 of the thin film transistor TFT. Also, the storage contact hole 22 can be formed simultaneously with the drain contact hole 16 of the thin film transistor TFT is formed.

Then, the pixel electrode 14 is patterned on the passivation film 38, so that the pixel electrode 14 is connected to the storage electrode 20 through the storage contact hole 22. The patterning of pixel electrode 14 for connecting to the storage electrode 20 can also include the patterning of the pixel electrode 14 for connecting to the thin film transistor TFT is patterned.

In fabricating the color filter substrate 70, a black matrix 72 is coated at regular separated intervals on the glass substrate 71. Red R, green G and blue B color filters 73 are formed on a lower surface portion of the glass substrate 71 such that the color filters 73 extend onto a lower surface of the black matrix 72. A metal material is formed on the entire surface of the color filters 73 and on the black matrix 72, and then patterned to form a common electrode 74. An orientation film 75 is formed on the lower surface of the common electrode, which is then subjected to rubbing to complete fabrication of the upper substrate 70.

When the thin film transistor array substrate 50 and the color filter substrate 70 are completely fabricated, a sealing material 60 is printed on the thin film transistor array substrate 50 and a spacer (not shown) is placed on the thin film transistor array substrate 50. In the alternative, the sealing material 60 can be printed on the color filter substrate 70 while the spacer is placed on the thin film transistor array substrate 50. After the sealing material 60 is printed and the spacer is placed, the thin film transistor array substrate 50 and the color filter substrate 70 are adhered together. The alignment between the thin film transistor array substrate 50 and the color filter substrate 70 is within an allowed margin determined during the design process of the thin film transistor array substrate 50 and the color filter substrate 70. Usually, a few $\mu$m of precision is required if it goes beyond this precision, light leaks out and the resultant picture quality can be far from an expectation of a desired picture quality for the liquid crystal display device.

The adhered thin film transistor array substrate 50 and the color filter substrate 70 are cut into liquid crystal panel units. The process of cutting a liquid crystal panel into units improves yield as opposed to simultaneously forming a plurality of liquid crystal cells on a large-scale glass substrate. Typically, cutting a liquid crystal panel into units includes a scribing process, which forms a cut line on the surface of the glass substrate with a pen made of a diamond material having a high hardness compared to the glass substrate, and a breaking process which cuts by applying a mechanical force perpendicular to the glass substrate. Liquid crystal is injected into the cut liquid crystal panel unit and sealed in between the orientation films 51 and 75 facing manner each other respectively on the thin film transistor array substrate 50 and the color filter substrate 70.

In the alternative, the liquid crystal display device can be fabricated by injecting the liquid crystal into a liquid crystal panel and then the liquid crystal panel is cut into liquid crystal panel units. However, as the size of the liquid crystal panel increases, it is difficult to control the process for uniformly injecting the liquid crystal. The non-uniformity of injection of the liquid crystal can degrade the productivity. Thus, the above-described method is used in which the liquid crystal panel is cut into liquid crystal panel units and then the liquid crystal is injected into the liquid crystal panel units. Since the unit liquid crystal panel has only a few $\mu$m of infinitesimal cell gap for the hundreds of $cm^2$ area, a vacuum injection method is most frequently used which uses a pressure difference between an inner side and an outer side of the unit liquid crystal panel, in order to effectively inject the liquid crystal thereto.

A light transmission process of a liquid crystal panel fabricated through the above described process will now be described in more detail. First, a common electrode voltage is supplied to the common electrode 74 which is integrally formed on the entire surface of the color filter substrate 70.

A scan signal is sequentially supplied from the gate driver integrated circuit formed at the thin film transistor array substrate 50 to the gate line 4. Accordingly, the liquid crystal cells arranged in a matrix form are sequentially selected by a gate line 4. The scan signal supplied to the liquid crystal cells of the selected gate line 4 is applied to the gate electrode 10 of the thin film transistor TFT provided in the liquid crystal cells of a selected line of liquid crystal cells, forming a conductive channel between the source electrode 8 and the drain electrode 12.

A data signal is supplied to the selected liquid crystal cell of the gate line 4 from the data driver integrated circuit through the data line 2, and the data signal is applied to the source electrode 8 of the thin film transistor TFT. Accordingly, the data signal supplied to the source electrode 8 of the thin film transistor TFT is supplied to the drain electrode 12 through the conductive channel during an interval that the scan signal is being applied, and the data signal supplied to the drain electrode 12 of the thin film transistor TFT is supplied to the pixel electrode 14 connected to the drain electrode 12, to drive the liquid crystal cell. Since the pixel electrode 14 is connected to the storage electrode 20 through the storage contact hole 22, the data signal supplied to the pixel electrode 14 is supplied to the storage electrode 20 during the interval that the scan signal is applied and charges the storage capacitor 18. The voltage with which the storage capacitor 18 is charged is supplied to the pixel electrode 14 during the turn-off interval of the thin film transistor TFT that the scan signal is not applied, so that the liquid crystal cell is still being driven.

As mentioned above, since the common electrode voltage is applied to the common electrode 74 integrally formed at the entire surface of the color filter substrate 70 and the voltage of the data signal is applied to the pixel electrode 14 of the liquid crystal cells selected by the gate line 4 unit on the thin film transistor array substrate 50, an electric field is applied to the liquid crystal layer 80 formed between the common electrode 74 and the pixel electrode 14. When the electric field is applied to the liquid crystal layer 80, the liquid crystal layer 80 is rotated by a dielectric anisotropy, transmitting the light emitted from the back light through the thin film transistor array substrate 50 and the pixel electrode 14 to the color filter substrate 70 through the common electrode 74. The strength of the electric field is controlled according to the size of the voltage of the data signal applied to the pixel electrode 14. The light transmittance of the liquid crystal layer 80 is controlled by the strength of the electric field. Continuously applying a certain directional electric field to the liquid crystal layer 80 can cause a degradation of the liquid crystal. Thus, in order to prevent such a degradation of the liquid crystal, a positive/negative voltage of the data signal is alternately applied to the common electrode 74, which is called an inversion driving method.

FIG. 2 shows exemplary voltage waveforms applied to the liquid crystal panel. For example, the common electrode voltage Vcom is applied to the common electrode 74, a data voltage $V_{DATA}$ of the data signal is applied to the source electrode 8 of the thin film transistor TFT through the data line 2, and the scan signal $V_G$ is applied to the gate electrode 10 of the thin film transistor TFT through the gate line 4 by each frame unit. Accordingly, at the turn-on interval of the thin film transistor TFT when the scan signal $V_G$ of the nth frame is applied with a high potential, a positive data signal voltage value $V_{DATA}$ is supplied from the source electrode 8 to the pixel electrode 14 through the drain electrode 12 to drive the liquid crystal and charged the storage capacitor 18. At this time, the positive data signal voltage value $V_{DATA}$ applied to the pixel electrode 14 gradually changes due to the influence of the liquid crystal capacitance and the storage capacitor 18 capacitance, as shown in the pixel electrode voltage Vp waveform in FIG. 2. In the instance where the thin film transistor TFT is turned off as the scan signal $V_G$ is transited from a high potential to a low potential, a voltage drop occurs due to a parasitic capacitance from the charged pixel electrode voltage Vp, which is called a kick-back voltage ΔVp as shown in FIG. 2. At the turn-off interval of the thin film transistor TFT that the scan signal $V_G$ is applied with a low potential, the pixel electrode voltage Vp charged in the storage capacitor 18 is continuously supplied to the pixel electrode 14, maintaining the driving of the liquid crystal layer 80.

Meanwhile, in the (n+1)th frame, since the above-described inversion driving method is used, a negative data signal voltage value $V_{DATA}$ is supplied from the source electrode 8 to the pixel electrode 14 through the drain electrode 12 and charges the storage capacitor 18. Accordingly, as shown in FIG. 2, the pixel electrode voltage Vp of the (n+1)th frame has a voltage waveform symmetrical to the pixel electrode voltage Vp of the nth frame at the turn-on, transition and turn-off interval of the thin film transistor TFT on the basis of the common electrode voltage Vcom. When the electric field is applied to the liquid crystal layer 80 and light emitted from the back light is transmitted toward the color filter substrate 70 from the thin film transistor array substrate 50, a portion of the transmitted light is reflected from the black matrix 72 formed at the color filter substrate 70, and from the red, green and blue color filters 73. A portion of the reflected light is radiated on the channel region of the thin film transistor TFT formed at the thin film transistor array substrate 50.

Since the channel region of the thin film transistor TFT is a semiconductor layer 32 made of an amorphous silicon, the light is absorbed thereto and the turn-off current of the thin film transistor TFT is increased. When the turn-off current of the thin film transistor TFT is increased, the pixel electrode voltage Vp charged in the storage capacitor 18 during the turn-off interval of the thin film transistor TFT is gradually decreased, as shown in FIG. 2.

Because the red, green and the color filters 73 have different light reflectivity, the amount of light made incident on the semiconductor layer 32 of the thin film transistor TFT formed at each liquid crystal cell corresponding to the red R, green G or blue B color filters 73 differs. Typically, the channel region of the thin film transistor TFT is designed to have the same width and length for every liquid crystal cell, so that thin film transistor TFT has the same electric characteristics. However, if the amount of light incident on the channel regions differs, the electric characteristics of each thin film transistor TFT becomes different in that they will have different turn-off currents. In particular, liquid crystal cells having a red R or blue B color filters, which have a low reflectivity, can have different turn-off currents than a liquid crystal cell having a green G color filter, which has a high reflectivity.

FIG. 3 shows a graph of a current value Ids of the drain-source according to the gate applied voltage Vg, in the turn-off interval of the thin film transistor TFT. The turn-off current value of a waveform S1 without a color filter 73 has the smallest values. The waveforms S2 and S3 respectively using red R and blue B color filters 73 have similar waveforms with slightly larger values. The waveform S4 using a green G color filter 73 has a waveform with the greatest values.

FIG. 4 shows the pixel electrode voltage Vp of liquid crystal cells using the red R, green G and blue B color filters. The pixel electrode voltage Vp charged in the storage capacitor 189 of the liquid crystal cell corresponding to the green G color filter during the turn-off interval of the thin film transistor TFT is the most severely reduced, as shown in FIG. 4. Thus, the conventional liquid crystal display device has a serious flicker problem that occurs due to the reflective difference between the liquid crystal cells corresponding to the red R and blue B color filters and the liquid crystal cells corresponding to the green G color filter.

SUMMARY OF THE INVENTION

Therefore, an object of the present invention is to provide a substrate structure of a liquid crystal display device that is capable of preventing a flicker from occurring in a liquid crystal cell of a specific pixel cell, which is due to a photo leakage current of a thin film transistor caused by liquid crystal cells having different color filters.

To achieve these and other advantages and in accordance with the purpose of the present invention, as embodied and broadly described herein, there is an embodiment of a liquid crystal display including: a color filter substrate having a red, green and blue color filters formed thereon as a matrix; a thin film transistor array substrate having liquid crystal cells of red, green and blue pixels corresponding to the red, green and blue color filters, wherein each liquid crystal cell has a thin film transistor; and a liquid crystal layer between the color filter substrate and the thin film transistor array substrate, wherein a first channel width/length ratio is provided for a thin film transistor in the liquid crystal cell of a first color pixel that is different from a second channel width/length ratio provided for a thin film transistor in the liquid crystal cells of a second color pixel.

In another embodiment, there is a liquid crystal display including: a color filter substrate having a red, green and blue color filters formed as a matrix thereon; a thin film transistor array substrate having liquid crystal cells of red, green and blue pixels corresponding to the red, green and blue color filters, each liquid crystal cell having a thin film transistor; and a liquid crystal layer between the color filter substrate and the thin film transistor array substrate, wherein a first channel width/length ratio of thin film transistors provided in the liquid crystal cells of the green pixels is smaller than a second channel width/length ratio of thin film transistors provided in the liquid crystal cells of the red and blue pixels.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1A:
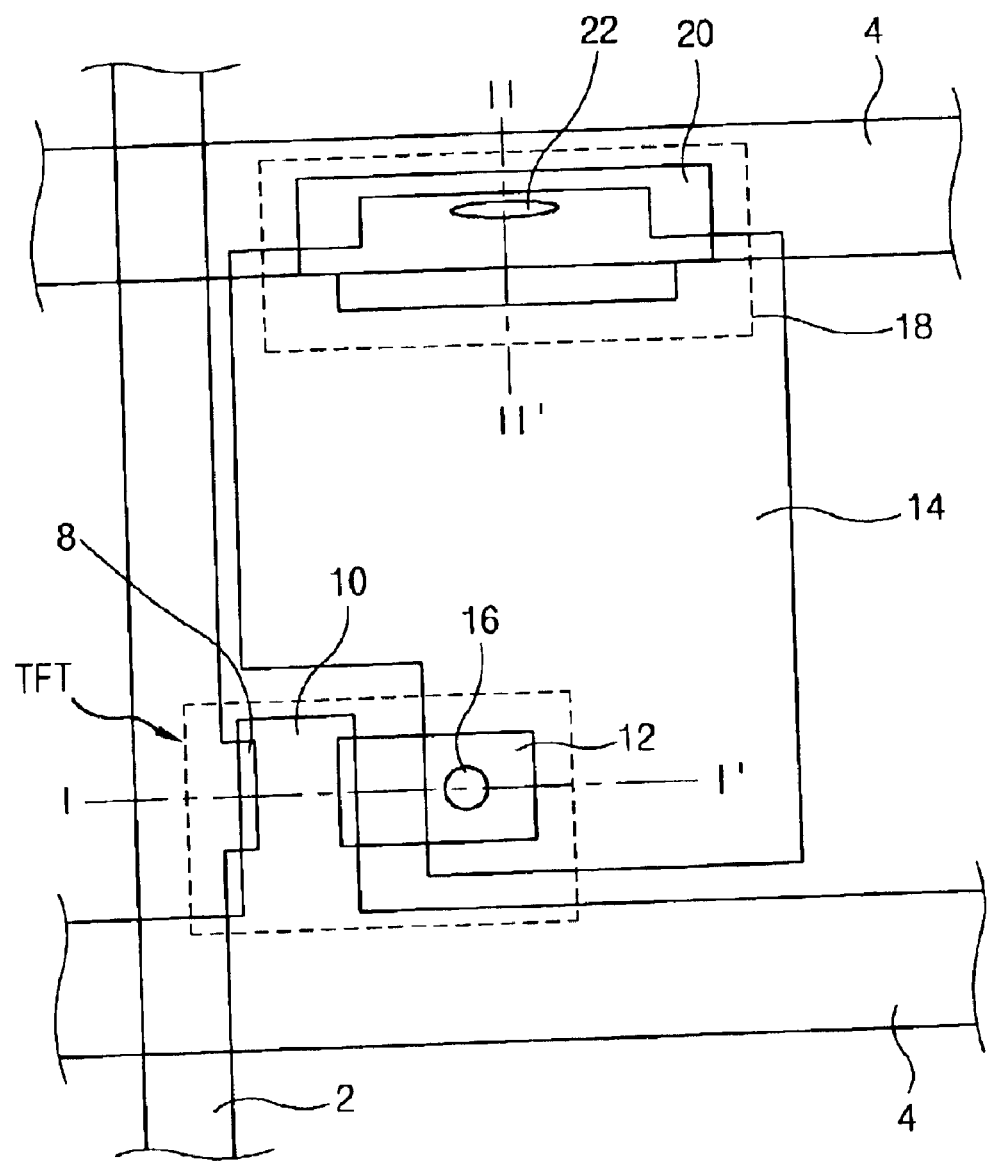
FIG. 1A is an exemplary view showing a general plane construction of a unit liquid crystal cell of a liquid crystal display device.
Figure 5:
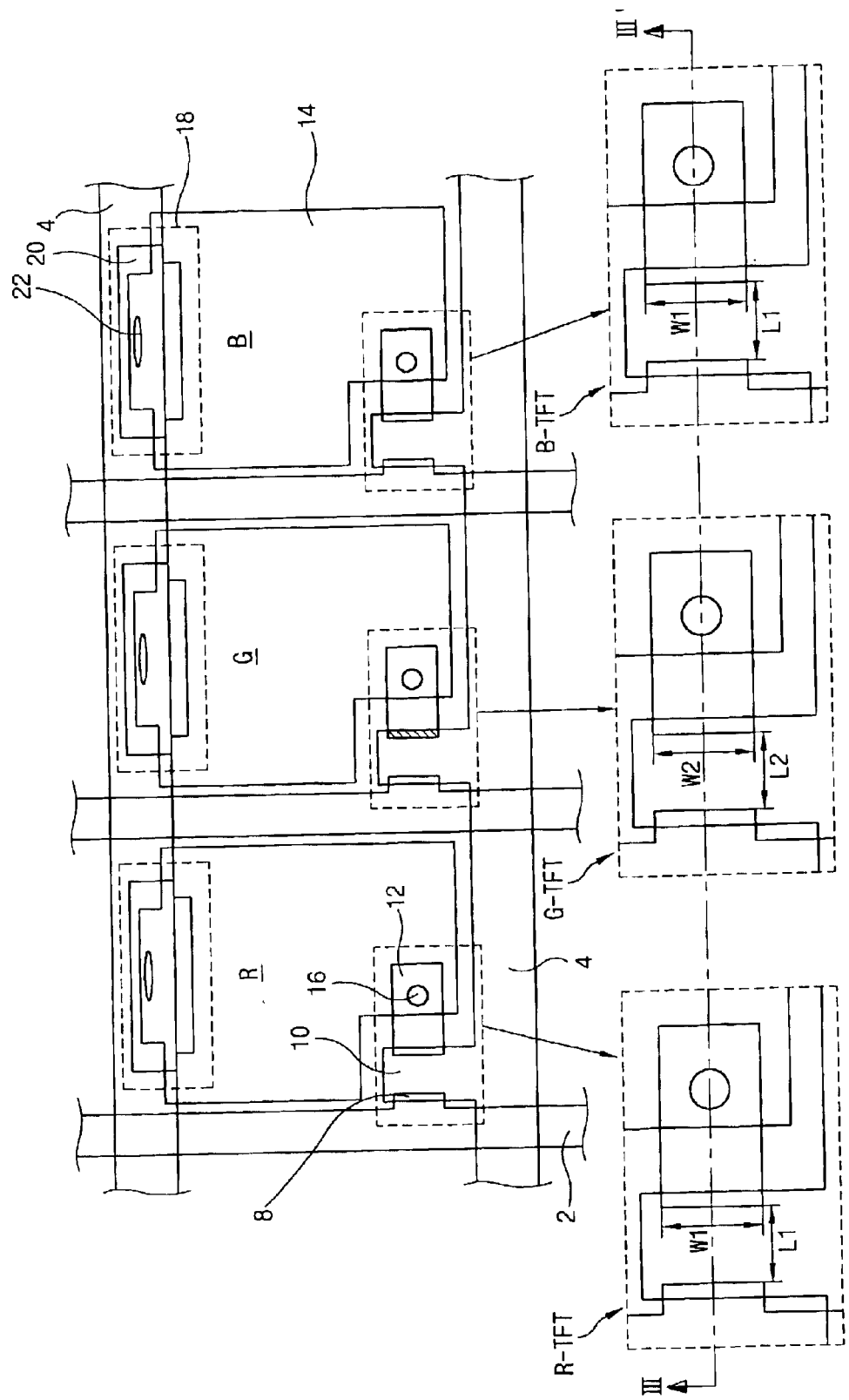
FIG. 5 is a plan view showing a substrate structure of a liquid crystal display device in accordance with one embodiment of the present invention.

FIG. 5 is an exemplary plan view showing a substrate structure of a liquid crystal display device in accordance with one embodiment of the present invention. As shown in FIG. 5, liquid crystal cells of red R, green G and blue B pixels are illustrated and thin film transistors R-TFT, G-TFT and B-TFT provided respectively in the liquid crystal cells of the red R, green G and blue B pixels are also illustrated in an enlarged plan view. Same reference numerals are given to the same elements of each liquid crystal cell as in FIG. 1A, except for the thin film transistors R-TFT, G-TFT, and B-TFT provided in the liquid crystal cells of the red, green and blue pixels. Thus, detailed descriptions of elements other than the thin film transistors R-TFT, G-TFT, and B-TFT are the same for those in FIG. 1A and are omitted herein.

Figure 1B:
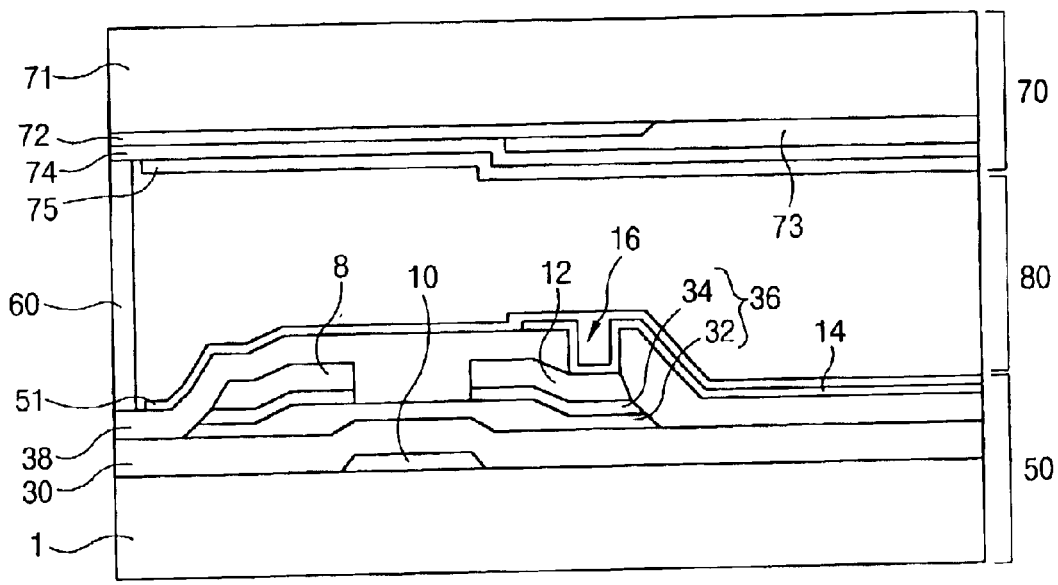
FIG. 1B is an exemplary view showing a sectional construction of a thin film transistor taken along line I–I' of FIG. 1A.
Figure 1C:
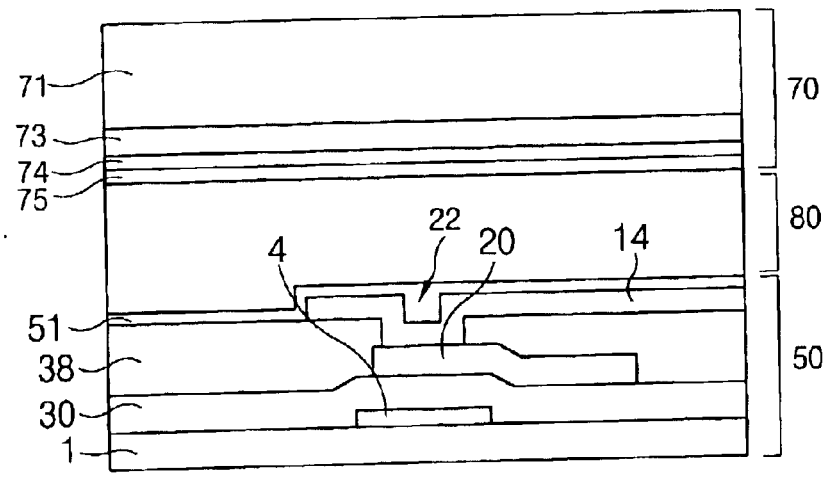
FIG. 1C is a sectional view showing a storage capacitor region taken along line II–II" of FIG. 1A.
Figure 2:
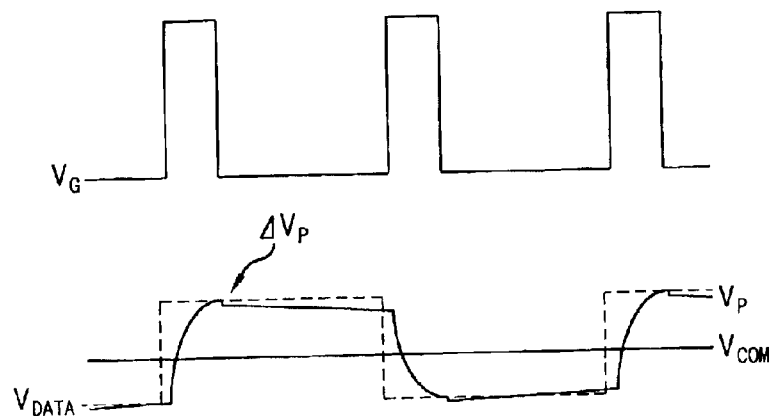
FIG. 2 is an exemplary view showing a voltage waveform applied to a liquid crystal panel of FIGS. 1A through 1C.
Figure 3:
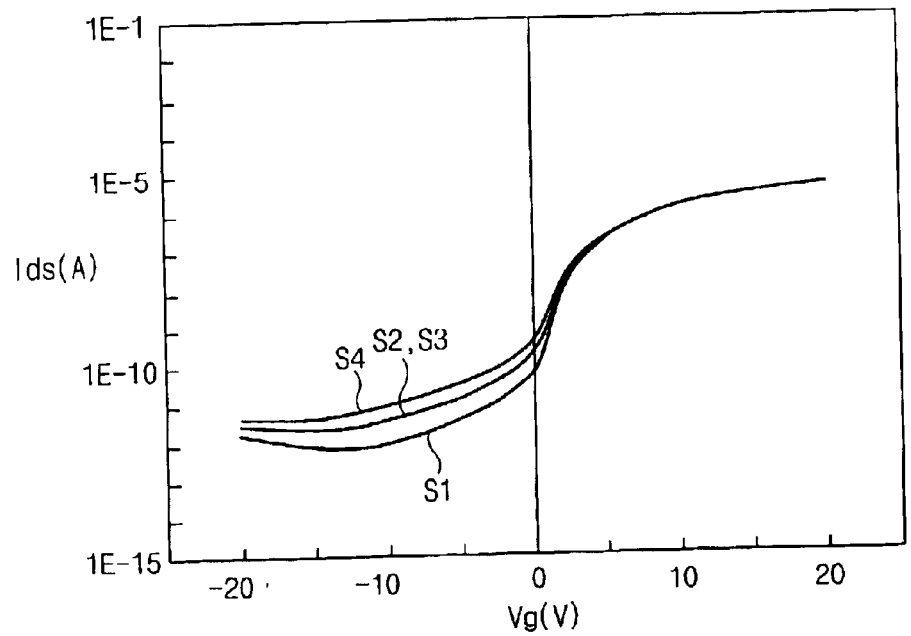
FIG. 3 is a graph showing a current value Ids of a drain-source according to a gate applied voltage VG of FIGS. 1A through 1C.
Figure 4:
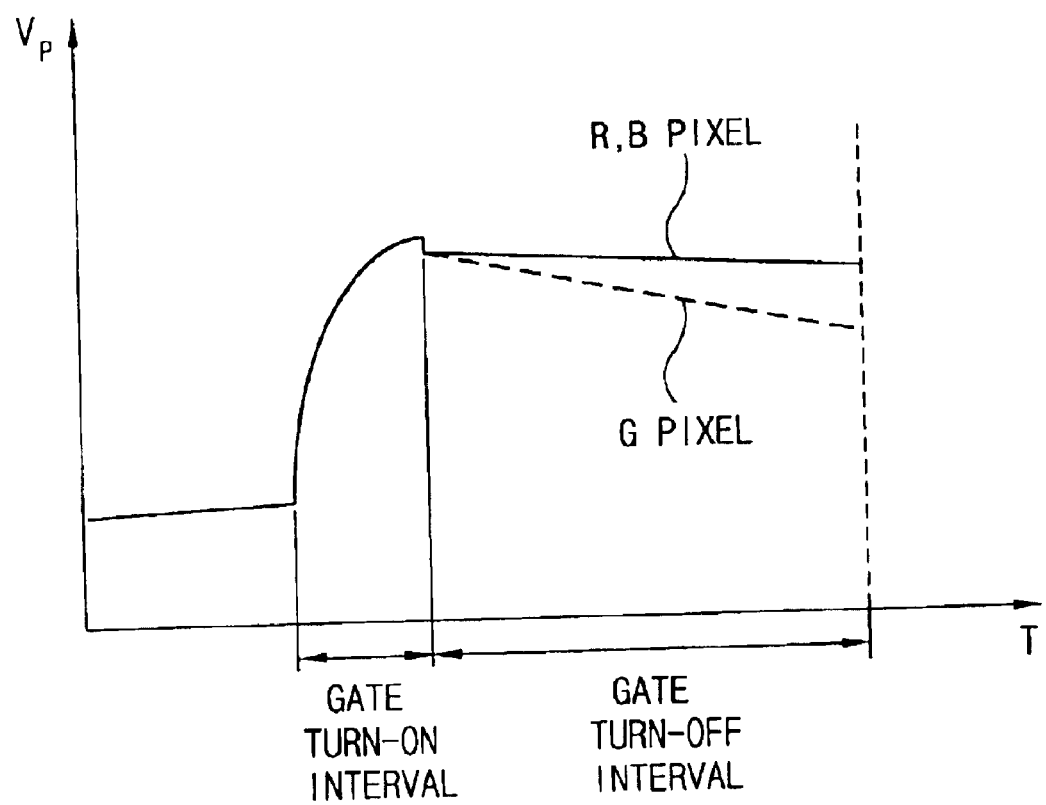
FIG. 4 is a graph showing a pixel electrode voltage of a liquid crystal cell according to red R, green G and blue B color filter of FIGS. 1A through 1C.
Figure 6:
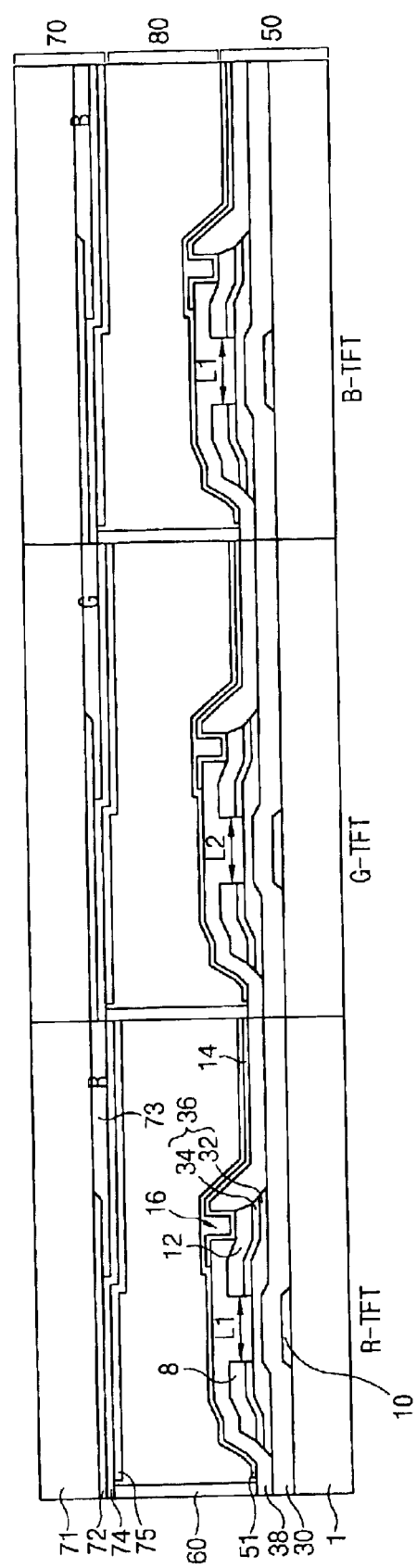
FIG. 6 is a cross-sectional view of thin film transistors provided in the liquid crystal cells of the red, green and blue pixels taken along line III–III' of FIG. 5.

FIG. 6 is a cross-sectional view of a thin film transistors provided in liquid crystal cells of the red, green and blue pixels of FIG. 5. Same reference numerals are given to the same elements as in FIG. 1B, descriptions of which are thus omitted. With reference to FIGS. 5 and 6, the channel regions of the thin film transistors R-TFT, G-TFT-B-TFT provided in the liquid crystal cells of the red R and blue B pixels are different than the green G pixels. That is, the channel regions of the thin film transistors R-TFT and B-TFT provided in the liquid crystal cells of the red R and B blue pixels have a channel width/length ratio of W1/L1, while the channel region of the thin film transistor G-TFT provided in the liquid crystal cell of the green G pixel has a channel width/length ratio of W2/L2. The channel width/length ratio of W2/L2 for the channel region in the thin film transistor G-TFT provided for the liquid crystal cell of the green G pixel is smaller than the channel width/length ration of W1/L1 for the channel region of the thin film transistors R-TFT and B-TFT provided for the liquid crystal cells of the red R and blue B pixels.

In general, if a channel width of a thin film transistor is increased, a photo leakage current will increase for a given amount of light corresponding to the increased amount of radiated light received by the channel region. If the length of the channel is increased, the photo leakage current for the given amount of radiated light is reduced due to increased channel resistance. In the case that the channel width/length ratio W2/L2 of the thin film transistor G-TFT provided in the liquid crystal cell of the green pixel is the same as the channel width/length ratio W1/L1 of the thin film transistors R-TFT, B-TFT and the same amount of light is radiated to the channel regions, more photo leakage current is generated in the thin transistor G-TFT provided in the liquid crystal cell of the green pixel than the photo leakage current generated in the thin film transistors R-TFT and B-TFT provided in the liquid crystal cells of the red and blue pixels. This is due to the red and blue color filters having a relatively low reflectivity while the green color filter has a relatively high reflectivity.

Accordingly, more radiated light is reflected to the channel region of the thin film transistor G-TFT provided in the liquid crystal cell of the green pixel compared to the amount of radiated light reflected to the channel regions of the thin film transistors R-TFT and B-TFT provided in the liquid crystal cells of the red and blue pixels. Thus, the turn-off current value of the thin film transistor G-TFT provided in the liquid crystal cell of the green pixel is more than the turn-off current value of the thin film transistors R-TFT and B-TFT provided in the liquid crystal cells of the red and blue pixels causing a luminance difference between the liquid crystal cells of the red and blue pixels to the green pixel.

To prevent the luminance difference between the liquid crystal cells of the red and blue pixels to the green pixel, the channel width/length ratio W2/L2 of the thin film transistor G-TFT provided in the liquid crystal cell of the green pixel is made smaller than the channel width/length ratio W1/L1 of the thin film transistors R-TFT and B-TFT provided in the liquid crystal cell of the red and blue pixels, as shown in FIG. 5. Even though more radiated light is reflected to the channel region of the thin film transistor (G-TFT) provided in the liquid crystal cell of the green pixel, the luminance difference between the liquid crystal cell of the green pixel and the red and the blue pixels is prevented by making the turn-off current value of the thin film transistor G-TFT provided in the liquid crystal cell of the green pixel and the turn-off current value of the thin film transistors R-TFT and B-TFT provided respectively in the liquid crystal cells of the red and blue pixels approximately the same such that flicker is minimized.

There are at least three ways to make the channel width/length ratio of the thin film transistor provided in the liquid crystal cell of the green pixel to be smaller than the channel width/length ratio of the thin film transistors provided in the liquid crystal cells of the red and blue pixel. The first is to make the channel width of the thin film transistor provided in the liquid crystal cell of the green pixel smaller than the channel width of the thin film transistors provided in the liquid crystal cells of the red and blue pixels. Second, the channel length of the thin film transistor provided in the liquid crystal cell of the green pixel can be made larger than the channel length of the thin film transistors provided in the liquid crystal cells of the red and blue pixels. Third, both the channel width and the channel length of the thin film transistor provided in the liquid crystal cell of the green pixel are changed so as to make the channel width/length ratio smaller than the channel width/length ratio of the thin film transistors provided in the liquid crystal cells of the red and blue pixels.

Figure 7:
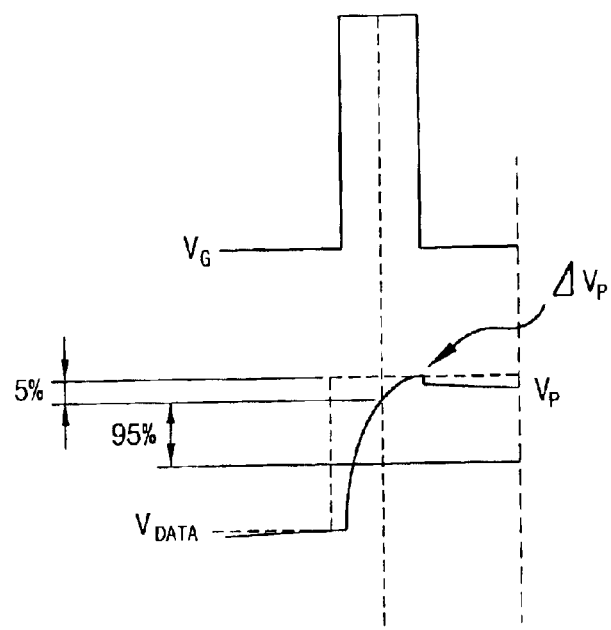
FIG. 7 is a graph showing a scan signal, pixel electrode voltage and a data signal voltage applied to the liquid crystal cell of the green pixel of FIGS. 5 and 6.

The channel width, the channel length or channel width/length ratio of the thin film transistor provided in the liquid crystal cell of the green pixel is controlled in to be in a range such that a pixel electrode can be charged to at least more than 90% of the voltage of the data signal through the thin film transistor provided in the liquid crystal cell of the green pixel in the turn-on interval when a high potential scan signal is applied. For example, as shown in FIG. 7, the pixel electrode is charged to more than 95% of a data signal voltage value $V_{DATA}$ at a middle point of the turn-on interval through the thin film transistor G-TFT provided in the liquid crystal cell of the green pixel in the turn-on interval when a high potential scan signal $V_G$ is applied. In addition, the channel width, the channel length or the channel width/length ratio of the thin film transistor G-TFT provided in the liquid crystal cell of the green pixel is controlled such that the area of overlap between the gate electrode 10 and the drain electrode 12 of the thin film transistor G-TFT provided in the liquid crystal cell of the green pixel is the same as the area of overlap between the gate electrode 10 and the drain electrode 12 of the thin film transistors R-TFT and B-TFT provided in the liquid crystal cell of the red and the blue pixels, as shown in FIG. 5.

The reason why the area where the gate electrode and the drain electrode of the thin film transistor provided in the liquid crystal cell of the green pixel overlap is the same as the area where the gate electrode and the drain electrode of the thin film transistors provided in the liquid crystal cell of the red and the blue pixels overlap to prevent a difference in a kick-back voltage ΔVp, as shown in FIG. 7, between the liquid crystal cells of the green, red and blue pixels. This prevents occurrence of a luminance difference between the liquid crystal cells of the green, red and blue pixels. A kick-back voltage ΔVp indicates a voltage reduction amount caused by a parasitic capacitance from the charged pixel electrode voltage when the scan signal is transited from a high potential to a lower potential. Factors affecting the kick-back voltage ΔVp are shown in the following equation 1:

$$\Delta Vp = \frac{Cgd}{C_{LC} + C_{ST} + Cgd} \Delta Vg \qquad 1$$

wherein CLC, CST and Cgd are respectively a liquid crystal capacitance, a storage capacitor capacitance, and a capacitance according to the overlap between the gate electrode and the drain electrode, respectively. ΔVg indicates a changed amount of a turn-on voltage and a turn-off voltage of the scan signal applied to the gate electrode.

Figure 8:
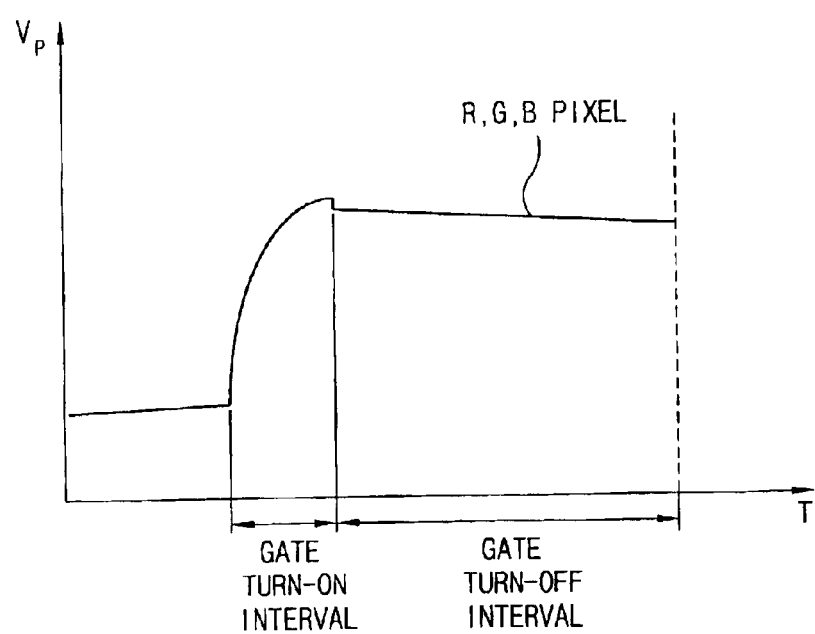
FIG. 8 is a graph showing a pixel electrode voltage of the red, green and blue pixels of FIGS. 5 and 6.

The channel width, the channel length or the channel width/length ratio of the thin film transistor provided in the liquid crystal cell of the green pixel in accordance with the present invention affects the capacitance caused by the overlap between the gate electrode and the drain electrode. Therefore, in order not to cause a difference in the kick-back voltage ΔVp between the liquid crystal cells of the green, red and the blue pixels, the area where the gate electrode 10 and the drain electrode 12 of the thin film transistor provided in the liquid crystal cell of the green is overlap is the same as the area of overlap between the gate electrode 10 and the drain electrode 12 of the thin film transistors R-TFT, B-TFT provided in the liquid crystal cells of the red and blue pixels. Accordingly, by having a channel width, channel length or channel width/length ratio of the thin film transistor provided in the liquid crystal cell of the green pixel in accordance with the present invention, the red, green and the blue pixels can exhibit the same waveforms during the turn-off interval of the thin film transistors provided in the liquid crystal cells of the red, green and blue pixels as shown in FIG. 8, which show the pixel electrode voltages of the liquid crystal cells in the red, green and blue pixels.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such metes and bounds are therefore intended to be embraced by the appended claims.

What is claimed is:

1. A liquid crystal display comprising:
  a color filter substrate having a red, green and blue color filters formed thereon as a matrix;

a thin film transistor array substrate having liquid crystal cells of red, green and blue pixels corresponding to the red, green and blue color filters, wherein each liquid crystal cell has a thin film transistor; and a liquid crystal layer between the color filter substrate and the thin film transistor array substrate, wherein a first channel width/length ratio is provided for a thin film transistor in the liquid crystal cell of a first color pixel that is different from a second channel width/length ratio provided for a thin film transistor in the liquid crystal cell of a second color pixel.

2. The liquid crystal display of claim 1, wherein the first color pixel is a red pixel and the second color pixel is a green pixel.

3. The liquid crystal display of claim 1, wherein the first color pixel is a blue pixel and the second color pixel is a green pixel.

4. The liquid crystal display of claim 1, wherein the second color pixel is a green color pixel and the second channel width/length ratio is smaller than the first channel width/length ratio.

5. The liquid crystal display of claim 4, wherein a pixel electrode in the liquid crystal cell of the green color pixel is charged to at least 90% of a voltage value of a data signal at the middle point of a turn-on interval through a thin film transistor provided in the liquid crystal cell of the green color pixel when a high potential scan signal is applied.

6. The liquid crystal display of claim 4, wherein an area of overlap between a gate electrode and a drain electrode of a thin film transistor provided in the liquid crystal cell of the green color pixel is same as an area of overlap between a gate electrode and a drain electrode of a thin film transistor provided in the liquid crystal cells of the red and blue color pixels.

7. The liquid crystal display of claim 1, wherein the blue color pixel and the red color pixel each have a thin film transistor with the first channel width/length ratio.

8. The liquid crystal display of claim 1, wherein a channel width of a thin film transistor provided in a liquid crystal cell of the green color pixel is smaller than a channel width of thin film transistors provided in liquid crystal cells of the red and blue color pixels.

9. The liquid crystal display of claim 8, wherein a pixel electrode in the liquid crystal cell of the green color pixel is charged to at least 90% of a voltage value of a data signal at the middle point of a turn-on interval through a thin film transistor provided in the liquid crystal cell of the green color pixel when a high potential scan signal is applied.

10. The liquid crystal display of claim 8, wherein an area of overlap between a gate electrode and a drain electrode of a thin film transistor provided in the liquid crystal cell of the green color pixel is same as an area of overlap between a gate electrode and a drain electrode of a thin film transistor provided in the liquid crystal cells of the red and blue color pixels.

11. The liquid crystal display of claim 1, wherein a channel length of a thin film transistor provided in a liquid crystal cell of the green color pixel is larger than a channel length of thin film transistors provided in liquid crystal cells of the red and blue color pixels.

12. The liquid crystal display of claim 11, wherein a pixel electrode in the liquid crystal cell of the green color pixel is charged to at least 90% of a voltage value of a data signal at the middle point of a turn-on interval through a thin film transistor provided in the liquid crystal cell of the green pixel when a high potential scan signal is applied.

13. The liquid crystal display of claim 11, wherein an area of overlap between a gate electrode and a drain electrode of a thin film transistor provided in the liquid crystal cell of the green color pixel is same as an area of overlap between a gate electrode and a drain electrode of a thin film transistor provided in the liquid crystal cells of the red and blue color pixels.

14. A liquid crystal display comprising:

a color filter substrate having a red, green and blue color filters formed as a matrix thereon;

a thin film transistor array substrate having liquid crystal cells of red, green and blue pixels corresponding to the red, green and blue color filters, each liquid crystal cell having a thin film transistor; and a liquid crystal layer between the color filter substrate and the thin film transistor array substrate, wherein a first channel width/length ratio of thin film transistors provided in the liquid crystal cells of the green pixels is smaller than a second channel width/length ratio of thin film transistors provided in the liquid crystal cells of the red and blue pixels.

15. The liquid crystal display of claim 14, wherein pixel electrodes of the green pixels are charged to at least 90% of a voltage value of a data signal at the middle point of a turn-on interval through a thin film transistor provided in the liquid crystal cell of a green pixel when a high potential scan signal is applied.

16. The liquid crystal display of claim 14, wherein an area of overlap between a gate electrode and a drain electrode of thin film transistors provided in the liquid crystal cells of the green pixels is same as an area of overlap between a gate electrode and a drain electrode of thin film transistors provided in the liquid crystal cells of the red and blue pixels.

17. The liquid crystal display of claim 14, wherein a channel width of thin film transistors provided in liquid crystal cells of the green pixels is smaller than a channel width of thin film transistors provided in liquid crystal cells of the red and blue pixels.

18. The liquid crystal display of claim 14, wherein a channel length of thin film transistors provided in liquid crystal cells of the green pixels is larger than a channel length of thin film transistors provided in liquid crystal cells of the red and blue pixels.

* * * * *